No. 717,548. PATENTED JAN. 6, 1903.
A. C. DANN & E. BOOS.
PLANTER.
APPLICATION FILED MAY 2, 1901.
NO MODEL. 3 SHEETS—SHEET 1.
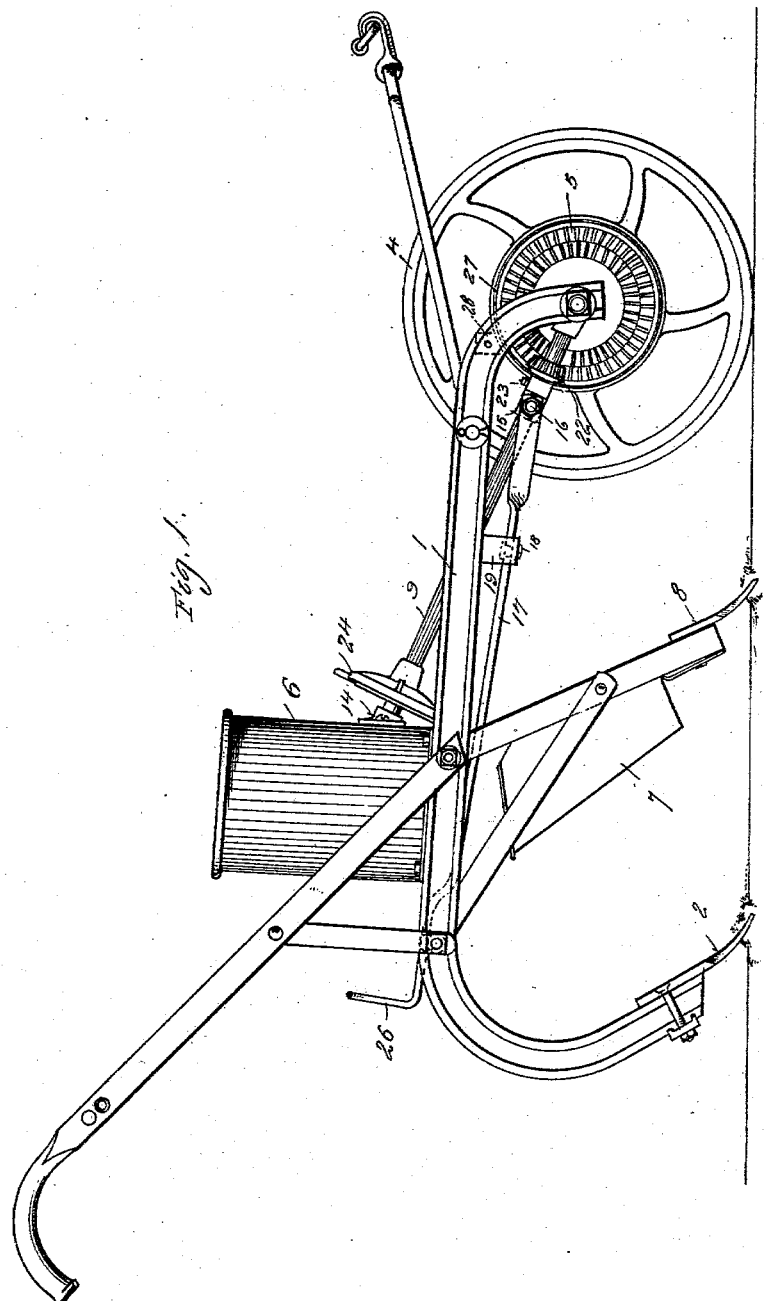

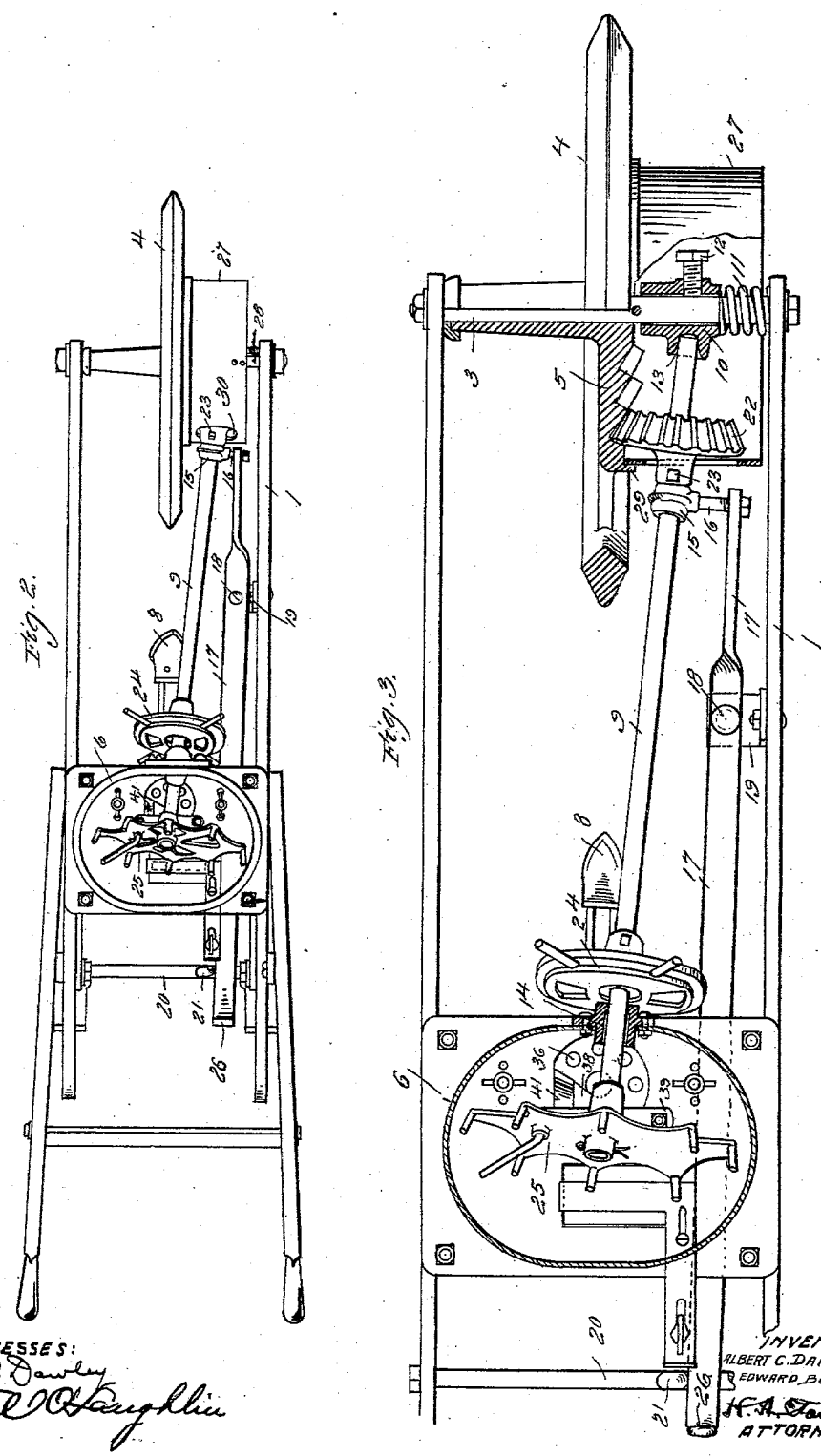

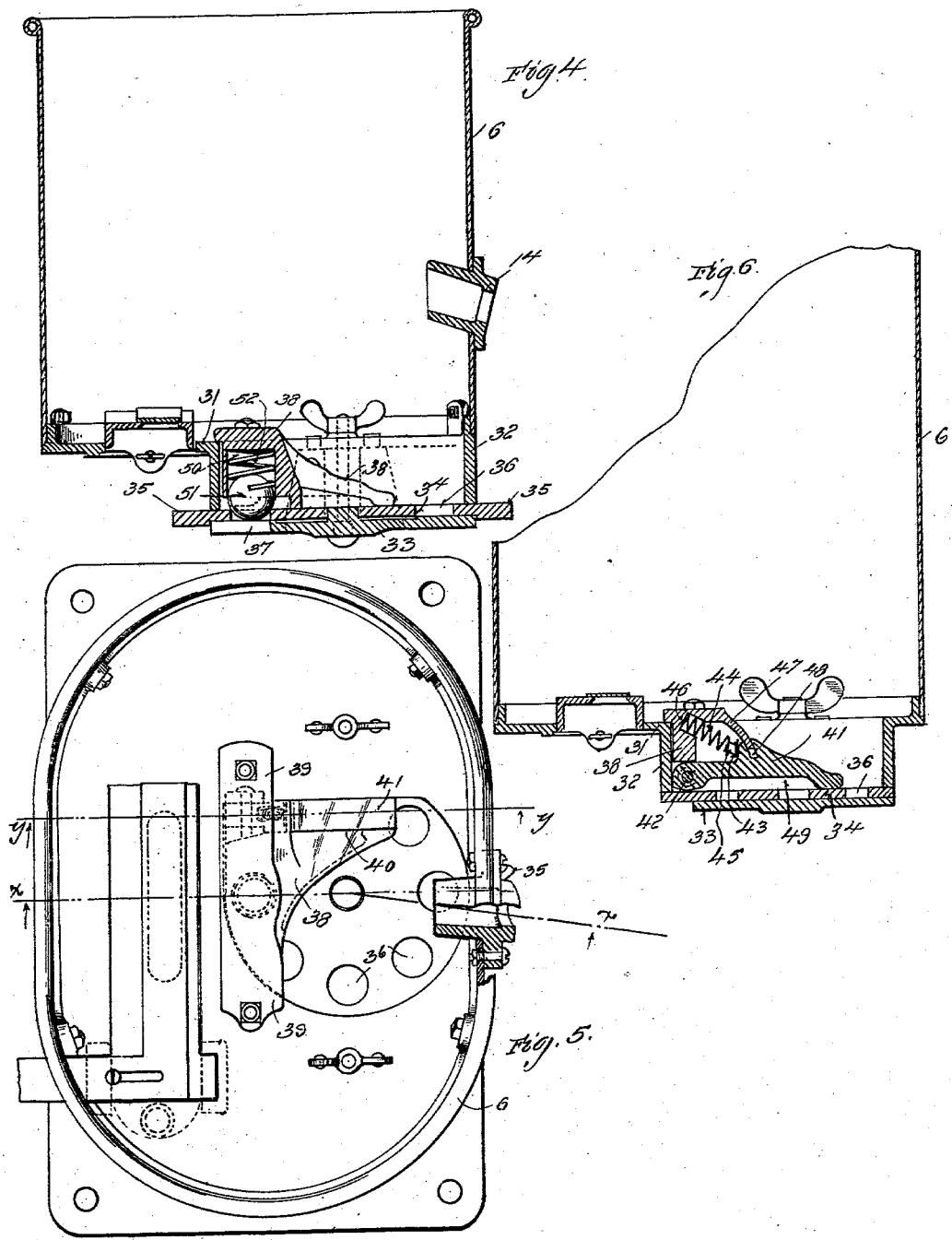

UNITED STATES PATENT OFFICE.

ALBERT C. DANN AND EDWARD BOOS, OF BELLEVUE, OHIO, ASSIGNORS TO THE OHIO CULTIVATOR COMPANY, OF BELLEVUE, OHIO, A CORPORATION OF OHIO.

PLANTER.

SPECIFICATION forming part of Letters Patent No. 717,548, dated January 6, 1903.

Application filed May 2, 1901. Serial No. 58,426. (No model.)

*To all whom it may concern:*

Be it known that we, ALBERT C. DANN and EDWARD BOOS, citizens of the United States, residing at Bellevue, in the county of Huron and State of Ohio, have invented certain new and useful Improvements in Planters, of which the following is a specification, reference being had therein to the accompanying drawings.

This invention relates to planters, and is more particularly adapted for use in connection with the type of combined cotton and corn planters disclosed in certain Letters Patent of J. D. Schofield, No. 388,452, dated August 28, 1888; No. 404,056, dated May 28, 1889; No. 434,051, dated August 12, 1890; No. 445,734, dated February 3, 1891, and No. 446,118, dated February 10, 1891.

Our present invention relates more particularly to the mechanism whereby motion is imparted to the seed-feeding devices and to the construction of said devices themselves, and has for its object to provide means whereby the motion of the seeding devices may be readily stopped and started, so as to suspend the planting while the machine is being turned around at the ends of the rows and also to provide the seed-feeding devices used in corn planting with means for effectively insuring the admittance of only the desired quantity of grain to the seed-cups and the positive ejection of this quantity of grain from the cups in a simple and efficient manner.

To these ends our invention consists in certain novel features, which we will now proceed to describe and will then particularly point out in the claims.

In the accompanying drawings, Figure 1 is a side elevation of a planter embodying our invention. Fig. 2 is a plan view of the same. Fig. 3 is an enlarged detail plan view of a portion of the machine, partly in horizontal section. Fig. 4 is a vertical sectional view through the hopper and seeding devices, taken on the line *x x* of Fig. 5 and looking in the direction of the arrows. Fig. 5 is a plan view of the hopper and seeding devices, partly in section; and Fig 6 is a vertical sectional view taken on the line *y y* of Fig. 5 and looking in the direction of the arrows.

In the said drawings, 1 indicates the frame of the machine, which is preferably constructed in the manner set forth in Patent No. 404,056, being composed of two parallel frame-bars bent downward and forward at the rear to receive the shovels 2 and having their downwardly-bent front ends connected by the shaft or axle 3, on which is mounted the driving-wheel 4, provided with the bevel-gear 5, having concentric rows of teeth. The frame 1 is provided near its rear end with a hopper 6 to receive the seed, said hopper being provided with seeding mechanism, to be hereinafter referred to, and serving to deposit the seed in the seed-tube 7 in the rear of the drill-tooth 8. These parts may be of any suitable construction.

9 indicates the inclined shaft by means of which the seeding devices are driven from the drive-wheel 4. The forward end of this shaft has its bearing in a sleeve 10, which is mounted loosely on the shaft or axle 3 and which is thrust normally toward the drive-wheel and its gear-wheel 5 by means of a spring 11, interposed between the sleeve and the frame 1. A set-screw 12 may be employed to lock the sleeve in position, if desired. The bearing 13 of the shaft 9 in the sleeve 10 is preferably a rocking bearing, so as to permit the shaft to vibrate slightly, as well as rotate, relatively to the sleeve.

14 indicates the bearing for the upper or rear end of the shaft, which is also a rocking bearing, permitting a slight vibration of the shaft relatively to the bearing, this bearing being mounted for convenience on the front of the hopper 6 or otherwise suitably supported.

A collar 15 loosely encircles the shaft 9 near its front end and is provided with a shaft 16, by means of which it is connected with the forward end of a lever 17, pivoted between its ends at 18 to the frame 1 or to a lug 19, projecting therefrom. The lever 17 extends to the rear of the machine back of the hopper 6 within convenient reach of the operator and preferably rests upon the rear cross-bar 20 of the frame, which is provided with a projection 21, having rounded or inclined sides, as shown, so that the lever may be readily lifted or forced over the same, but will be retained in position on either side of said projection when released.

Near the forward end of the shaft 9 there is mounted thereon a bevel-pinion 22, which may be adjusted longitudinally on the shaft to mesh with any one of the concentric series of gear-teeth of the bevel-gear 5, being secured on the shaft after adjustment by means of a set-screw 23 or in any other suitable manner. Near its rear end the shaft 9 is provided with a tappet-wheel 24, by means of which the corn-seeding mechanism may be driven, and at its rear extremity said shaft is provided within the hopper with a combined stirring and feeding wheel 25, coöperating with a hinged or pivoted spring-actuated tongue having a feed-slot and regulating-slide, as set forth in Patent No. 445,734, hereinbefore referred to.

It will be observed that when the parts just described are in the position shown in Figs. 2 and 3 the bevel-pinion 22 is in mesh with the bevel-gear 5, so that when the machine is in motion the seeding mechanism is in operation. When it is desired to stop the feed—as, for instance, in turning at the end of a row—it is only necessary to shift the rear end of the lever 17 over to the other side of the projection 21. This may be conveniently accomplished by the operator either with his hand or foot, the rear end of the lever being provided with a projection 26 for this purpose. When the rear end of the lever is thus shifted, its front end, through the collar 15, connected therewith, moves the forward end of the shaft 9 away from the bevel-gear 5, thus throwing the pinion 22 out of mesh with said gear and arresting the movement of the seeding devices. During this movement of the front end of the shaft 9 the spring 11 is compressed owing to the transverse movement of the sleeve 10 on the shaft 3. When it is desired to again start the seeding devices, it is only necessary to shift the rear end of the lever 17 back to its original position, when the pinion 22 will again mesh with the gear 5 and motion will be imparted to the shaft 9. This return of the parts is facilitated by the spring 11, which renders it necessary only to lift the rear end of the lever 17 sufficiently to clear the projection 21, when the spring 11 will again throw the pinion and gear into mesh. When it is desired to change the rate of feed by shifting the pinion 22 longitudinally on the shaft 9, the forward end of the said shaft may be moved over in the manner just described, so as to facilitate the shifting of the pinion across the face of the gear to the desired position, and after the pinion has been adjusted the parts may be readily brought back into mesh in the manner just described.

We have shown in connection with the gearing just described a cylindrical shield 27, inclosing both gears and supported from the frame 1 by means of an arm or bracket 28, the bevel-gear 5 having an annular flange 29, extending over the inner end of the cylindrical shield 27 and serving to effectually prevent the entrance of dust and dirt between said shield and gear. The shield is provided with a slot 30 for the passage of the shaft 9, said slot being of sufficient dimensions to permit the lateral adjustment of the shaft in the manner just described.

In Figs. 4, 5, and 6 we have shown our improved seeding mechanism for corn-planting, which in its general features is similar to the construction set forth in Patent No. 446,118, hereinbefore referred to. In this construction the hopper 6 is provided with a bottom 31, having an opening surrounded by a downwardly-extending circular flange 32, having a bottom plate 33, between which and the lower edge of the flange 32 is mounted the seed-plate 34. This plate has the projecting spurs or teeth 35 to engage the tappet-wheel 24 and is provided with the circular openings or seed-cups 36, which successively register with the discharge-opening 37 in the bottom plate 33. In the recess formed by the annular flange 32 is located the segmental block 38, having lugs 39, by means of which it is secured to the upper side of the bottom of the hopper and extending over and covering about one-quarter of the upper surface of the seed-cup. At the forward edge of said segmental block, or the edge toward which the seed-plate moves, there is a recess or cut-away portion 40, which receives a pivoted cut-off plate 41, pivoted at its rear end, as indicated at 42, in the block 38 and provided with a shoulder 43, between which and the block 38 is arranged a spring 44, which holds the free end of the cut-off plate against the top of the seed-plate. Preferably the shoulder 43 is provided with a stud 45, and the block is provided with a recess 46, the spring 44 being a coiled spring and being slipped over the stud and into the recess and being thus held in position. The block 38 is provided with a downwardly-extending curved shield 47, which extends into a correspondingly-shaped slot 48 in the top of the cut-off plate to prevent the entrance of the grain between the block and plate. The plate is recessed on its underside, as indicated at 49, so that only its forward edge bears upon the seed-plate. In the block 38, immediately above the discharge-opening 37, is formed a recess 50, in which is located a ball 51, backed by a spring 52 of such a diameter as to enter the seed cups or openings 36 as they successively pass under said ball, but without passing through said cups, the ball being of greater diameter than the cups. It will be seen that as the seed-cup is rotated the spring-controlled and pivoted cut-off plate will insure the entering into each cup or recess of the proper amount of grain and no more and that said grain will be discharged from each cup by means of the ball 51 as said cups successively pass between said ball and the discharge-opening 37. This cut-off is much more effective in securing an equal supply of grain to the feed-cups than is the ball cut-off set forth in Letters Patent No. 446,188, hereinbefore referred to, and is at the same time effectively protected from clogging by means of the shield 47, extending into the slot 48, while the ball 51 serves as an effective means for ejecting all of the seed contained in each cup.

We do not wish to be understood as limiting ourselves to the precise details of construction hereinbefore set forth, as it is obvious that they may be varied without departing from the principle of our invention.

Having thus fully described our invention, what we claim as new, and desire to secure by Letters Patent, is—

1. In a planter of the character described, the combination, with a frame having at its forward end a driving-wheel provided with a gear and having seeding devices at its rear end, of a longitudinal shaft for operating the seeding devices, said shaft being provided with a pinion at its forward end to mesh with the gear on the driving-wheel, the forward end of said shaft being movable toward and from the driving-wheel gear, and a foot-lever extending longitudinally of the frame, pivoted thereto between its ends, having its forward end connected with the forward end of said shaft, and its rear end resilient or vertically yielding and extending within reach of the foot of the operator, the frame being provided with a transverse member having a projection whereby said lever is locked against accidental displacement in either of its two positions, substantially as described.

2. In a planter of the character described, the combination, with a frame having at its forward end a driving-wheel provided with a gear and having seeding devices at its rear end, of a longitudinal shaft for operating the seeding devices, said shaft being provided with a pinion to mesh with the gear on the driving-wheel, the forward end of said shaft being movable toward and from the driving-wheel gear, a spring for moving the forward end of said shaft toward said gear, a foot-lever connected with the forward end of said shaft and extending rearward within reach of the foot of the operator, and means for holding said foot-lever against accidental displacement in either of its two positions, substantially as described.

3. In a planter of the character described, the combination, with a frame having at its forward end a shaft provided with a driving-wheel having a gear, said frame having seeding devices at its rear end, of a longitudinal shaft for operating the seeding devices, said shaft being provided with a pinion to mesh with the driving-wheel gear and having a rocking bearing at its rear end, a sleeve loosely mounted on the driving-wheel shaft and having a rocking bearing for the forward end of the longitudinal shaft, and a lever connected with said longitudinal shaft and extending rearward within reach of the operator, substantially as described.

4. In a planter of the character described, the combination, with a frame having at its forward end a shaft provided with a driving-wheel having a gear, said frame having seeding devices at its rear end, of a longitudinal shaft for operating the seeding devices, said shaft being provided with a pinion to mesh with the driving-wheel gear and having a rocking bearing at its rear end, a sleeve loosely mounted on the driving-wheel shaft and provided with a rocking bearing for the forward end of the longitudinal shaft, a spring mounted on the driving-wheel shaft and acting to force the sleeve normally toward the driving-wheel and its gear, a lever pivoted between its ends on the frame and having its forward end connected with the longitudinal shaft and its rear end within reach of the operator, and a locking device for the rear end of said lever, substantially as described.

5. In a planter of the character described, the combination, with a frame having seeding devices at its rear end and a fixed shaft at its forward end, of a driving-wheel loosely mounted on said shaft and provided with a plurality of concentric gears of varying diameter, a sleeve loosely mounted on said fixed shaft, a spring mounted on said shaft and acting to thrust the sleeve toward the driving-wheel and its gears, a longitudinal shaft for operating the seeding devices, said shaft being mounted in a rocking bearing at its rear end and in a similar bearing in the sleeve at its front end, a pinion longitudinally adjustable on the forward end of said last-mentioned shaft, a lever pivoted between its ends on the frame and loosely connected at its forward end with the longitudinal shaft, the rear end of said lever extending over a cross-bar of the frame and said cross-bar being provided with a locking projection, substantially as described.

6. In a planter of the character described, the combination, with a frame having at its forward end a driving-wheel provided with a gear having a circumferential flange, of a longitudinal shaft laterally movable at its forward end and provided with a pinion to mesh with the gear, and a cylindrical casing supported from the frame and having its inner edge embraced by the flange of the gear and inclosing said gear and pinion, said casing being slotted for the passage of the longitudinal shaft, substantially as described.

7. In a planter of the character described, the combination, with a hopper having a recess in its bottom, a bottom plate provided with a discharge-opening, and a seed-plate having circular openings or seed-cups, of an integral segmental block removably mounted in said recess and provided at its forward edge with a recess or cut-away portion and an integral downwardly-curved guard or shield, said segmental block being also provided with a recess in its under side above the discharge-opening, a cut-off plate hinged to the segmental block, mounted in the recess or cut-away portion at its forward edge, and provided with a groove or seat in its upper surface, into which the curved shield or guard extends, a spring for said cut-off plate, also mounted in said recess, and a spring-depressed ball mounted in the other recess of the segmental block above the discharge-opening, substantially as described.

In testimony whereof we affix our signatures in presence of two witnesses.

ALBERT C. DANN.
EDWARD BOOS.

Witnesses:
JOHN SCULLEN,
JESSE VICKERY.